United States Patent
Howell

[19]

[11] Patent Number: 6,024,034
[45] Date of Patent: Feb. 15, 2000

[54] MANUAL HAND-SOWING PRESS FOR THE PREPARATION OF SEED SOWING

[76] Inventor: Kirk David Howell, 1539 Oakhill Rd., Auburn, Ga. 30011

[21] Appl. No.: 09/067,259

[22] Filed: Apr. 27, 1998

[51] Int. Cl.$^7$ ..................................................... A01C 5/02
[52] U.S. Cl. ............................................... 111/92; 111/99
[58] Field of Search ............................ 33/571, 521, 1 H, 33/486, 809; 111/92, 99; 172/21, 22, 101, 116

[56] References Cited

U.S. PATENT DOCUMENTS

| | | | |
|---|---|---|---|
| 1,554,062 | 9/1925 | Zelenski | 111/99 |
| 2,020,571 | 11/1935 | Pick | 111/92 |
| 2,382,221 | 8/1945 | Groth | 111/99 X |
| 3,332,376 | 7/1967 | Saunoris et al. | 111/92 X |
| 4,934,289 | 6/1990 | Robinson | 111/99 |
| 5,152,348 | 10/1992 | Flanagan, Sr. et al. | 111/99 X |
| 5,325,798 | 7/1994 | Nowell et al. | 111/99 |

*Primary Examiner*—Robert E. Pezzuto

[57] ABSTRACT

A seed-sowing preparation press is a tool which will make quick and accurate impressions in nursery beds. The sowing press consists of a plurality of square rods each with screws at one end and receptacles at the other end so to be interconnected at will. On one side, and along the entire length of each rod, ruler impressions in inches and centimeters are printed. The rods are connected with a plurality of outer-press attachments, consisting of two square tubes, stacked and fixed perpendicularly, which allow for upper rods to cross perpendicular to lower rods, and thus forming the seed-sowing press framework. Along the length of the lower rods, a plurality of inner-press attachments, having only one square tube, are fastened at desired intervals within the framework. Two detachable thumbscrews fasten into the upper portion of each outer-press attachment and one detachable thumbscrew fastens into the upper portion of each inner-press attachment, securing rods and attachments at desired positions. On the bottom portion of both the outer-press (the lowest tube) and inner-press attachments a plurality of nipples and spacers are fastened by screwing into respective attachments. The nipples make the actual impression in the soil surface, preparing the ground for seed sowing. The spacers make it possible to adjust the depth for different seed-sowing specifications. Because of the connecting rods and outer-press attachments, there is great flexibility toward extending the size of the framework to fit any desired application.

3 Claims, 3 Drawing Sheets

MANUAL HAND-SOWING PRESS FOR THE PREPARATION OF SEED SOWING

TECHNICAL FIELD OF THE INVENTION

The present invention relates to the general art of agriculture, and to the particular field of sowing devices.

BACKGROUND INFORMATION

This invention is designed to facilitate the seed sowing operation. While it was originally designed to be used commercially, and may indeed have some utility in that situation, the greatest utilization may be found when it is employed in residential gardening.

On a commercial basis, most seed sowing in developed countries is performed mechanically; however, mechanical sowing does not always allow for sowing symmetrically. This is due to a fixed between row spacing, which facilitates seedling lifting. Any adjustments in spacing, therefore, is limited to between seed spacings, which eliminates the possibility to maintain symmetry between row and between seed. Hand sowing is more of an option in underdeveloped countries, where hand labor is less expensive than to purchase and operate advanced machinery.

On a residential basis, there are few tools, if any, on the market which will aid the sowing of seed in gardens, like the hand-sowing press. On packages of seed, precise spacing is often recommended for the best growing results, which often leaves the consumer with quite a tedious task of seed sowing. I would guess the earliest methods used to sow seed would be to employ a measurement stick and a pencil or the index finger (or some other scoring device) to make impressions in the soil, or to use a string-line, or to estimate the spacing by inspection, or to just randomly scatter the seeds by casting them on the ground, covering them with a thin layer of soil. Therefore, the object of the present invention is to eliminate a lot of unnecessary guess work involved in gardening, and another object is to enable the user to quickly and accurately make impressions in the preparation of seed sowing.

INVENTION SUMMARY

The present invention is a tool designed to make quick and accurate impressions in the soil on a commercial and/or residential basis. The present invention will enable the user to make impressions to accommodate most seed sizes, specified seed depths, and a plurality of spacings, whether they be symmetrical or not. The present invention can be made of strong, yet inexpensive materials, which will offer a lifetime of efficient utilization. Consisting of a plurality of square rods, outer- and inner-press attachments, thumbscrews, spacers and nipples, the present invention can be constructed into many possible arrangements, anywhere from 1) an inter-connected multi-framework using a plurality of frameworks to 2) an inter-connected rod using a plurality of rods.

DETAILED DESCRIPTION OF THE PREFERRED EMBODIMENT

Figure 1:
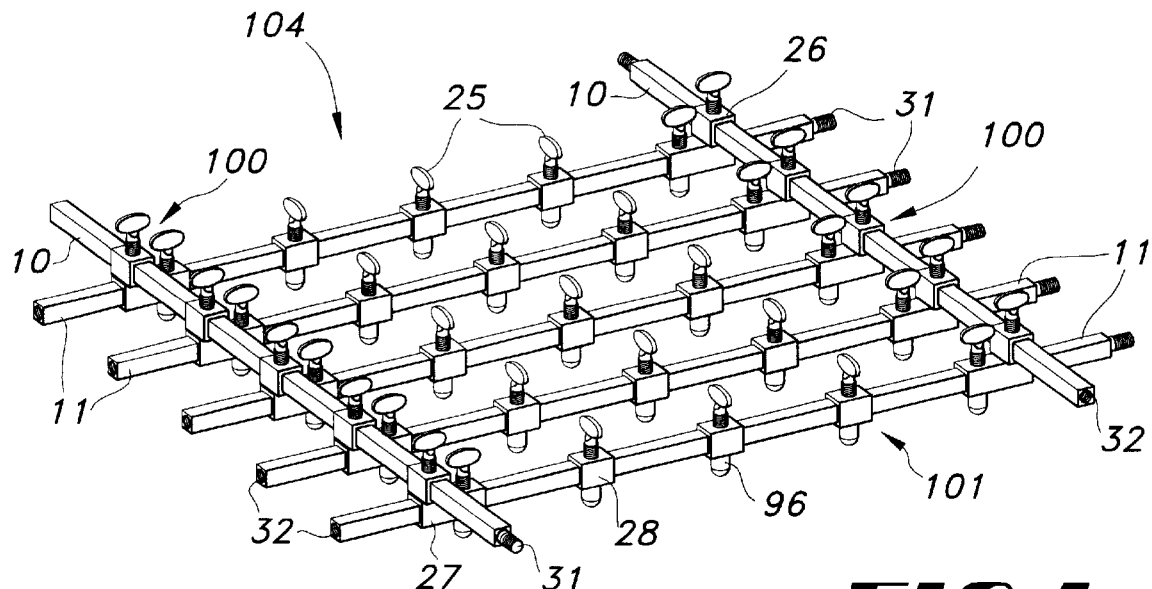
FIG. 1 is a perspective view of a manual press for the preparation of seed sowing, showing a grid orientation to determine the correct depth and spacing between seed sowing requirements.
Figure 2:
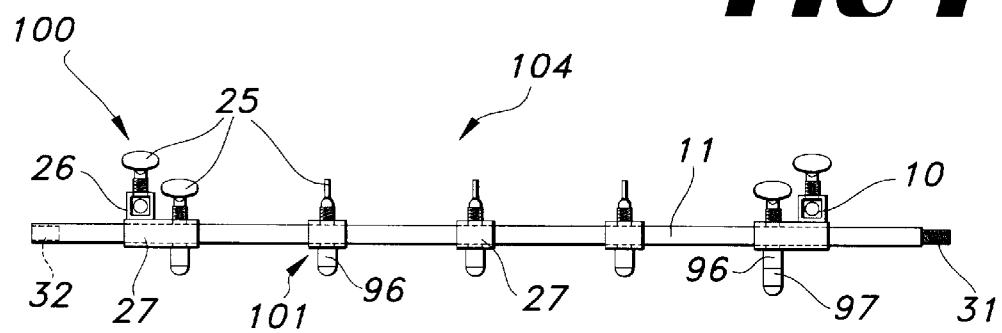
FIG. 2 is a right side view of a manual press for the preparation of seed sowing, showing for illustration purposes only, one of the screw-on nipples having an extension piece added for additional impression depth in soil to be prepared.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, in which like characters of reference indicate like parts throughout the several views, numeral 104 of FIGS. 1, 2, 3, 4, and 5 illustrates a preferred embodiment of a manual press for the preparation of seed sowing of this invention. For the purposes of better illustrating the new invention a twenty-four inch manual press for seed sowing is shown and described.

As best shown in FIG. 1, the manual press for the preparation of seed sowing includes two, twelve or twenty four inch outer square rods 10 or 11 and five, twelve or twenty four inch inner square rods 10 or 11. The press 104 has been designed in such a manner as to be lightweight and easy to assemble.

On either corner there are four outer-press attachment assembly's 100, to secure the perimeters by detachable thumbscrews 25 along the linear scale 33. Enclosed on both ends of the square rods 10 or 11 are an additional six outer-press attachment assembly's 100 to assist with the positioning and securing inner square rods 10 or 11 against outer square rods 10 or 11. Fifteen inner-press attachment assembly's 101 that are adjustable along a linear scale 33 referenced in FIG. 8 and secured detachable thumbscrews 25 to accommodate the varying requirements for seed sowing. The detachable thumbscrews 25 by and variable screw-on nipples 94, 95, or 96, or spacer extensions 97 serve as a dual securing device to sustain the positioning firmly along the square rods 10 or 11 during the soil impression process. The threaded area of the thumbscrew 25 is one-inch long by a half-inch wide.

Figure 8:
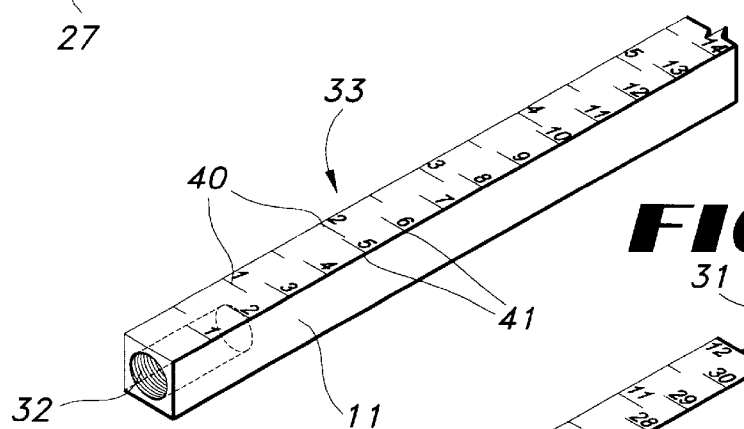
FIG. 8 is a segmented perspective view of one of the square rods having metric and imperial linear dimensions for spacing the inner-press attachment to the desired spacing of seed planting requirements.
Figure 9:
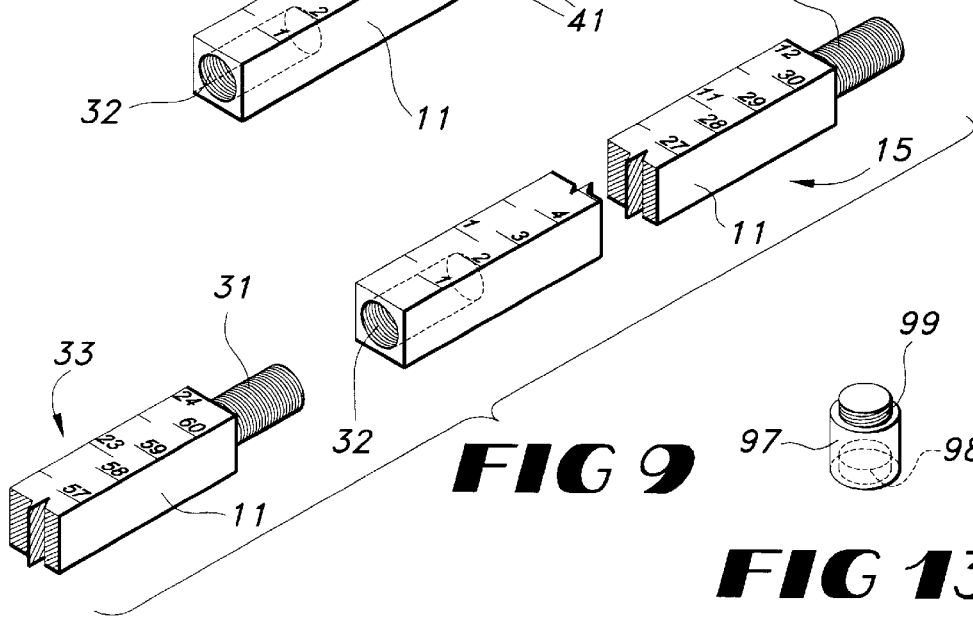
FIG. 9 is an exploded view of a male square rod and female extension rod connecting together in combination to form a longer and wider manual-press for larger area coverage.

Male and female attachment ends are included on the twelve or twenty-four inch outer square rod 10 or 11 and twelve or twenty-four inch inner square rod 10 or 11 referenced in FIG. 8 and FIG. 9. Each square rod having on opposing sides a one inch long by a half inch wide male thread 31 and a one inch deep by a half inch wide female receptacle 32. Additional extending rods 15 are used for mating the pieces together to extend the overall area of the press in any direction from original rod lengths of either twelve or twenty-four inches.

Further with reference to FIG. 8 and FIG. 9, the twelve or twenty-four inch square rod 10 or 11 is comprised of a linear scale 33 having an imperial (inch) measuring scale 40 and a metric (millimeter) measuring scale 41 for correct displacement of the inner-press attachments 101 and the outer-press attachments 100. The inner-press attachments 101 and the outer-press attachments 100 are shifted laterally and secured to accommodate the varying requirements for seed sowing specifications.

Figure 7:
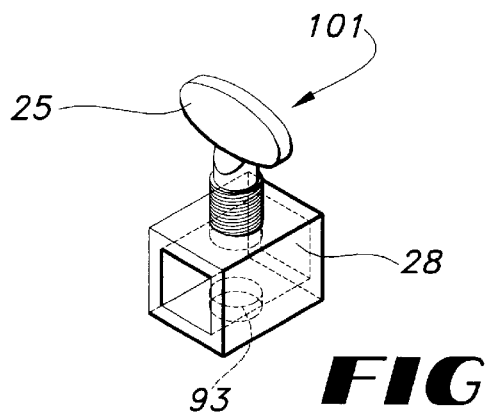
FIG. 7 is a perspective view of an in-line inner-press attachment.
Figures 10, 11, 12:
FIG. 10 is a perspective view of a quarter-inch screw-on nipple that attaches to the underside of the outer- and inner-press attachments.
FIG. 11 is a perspective view of a half-inch screw-on nipple that attaches to the underside of the outer- and inner-press attachments.
FIG. 12 is a perspective view of a three-quarter-inch screw-on nipple that attaches to the underside of the outer- and inner-press attachments.

The inner-press attachment assembly 101 shown in FIG. 7 is comprised of the following components: a one inch square tube on the inner-press attachment 28 to accommodate the twelve or twenty-four inch inner square rod 10 or 11, a detachable thumbscrew 25 to secure the inner-press attachment assembly 101 to the twelve or twenty-four inch inner square rod 10 or 11, and on the underside referenced in FIG. 12 a three-quarter inch screw-on nipple 96, attached for making soil impressions 51.

Figure 6:
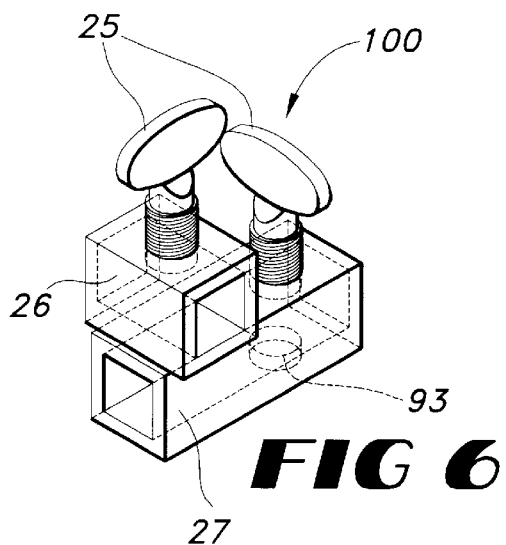
FIG. 6 is a perspective view of a corner outer-press attachment.

On each of the four corners there is an outer-press attachment assembly 100 shown in FIG. 6 comprising the following: a one inch square tube on the outer-press attachment 26 and a two inch square tube on the outer-press attachment 27 welded together to form a right angle. The two inch square tube on the outer-press attachment 27 takes up the twelve or twenty-four inch inner square rod 10 or 11 and is secured in place by a thumbscrew 25, and on the underside a three-quarter inch screw-on nipple 96 is attached for making soil impressions 51. The one inch square tube on the outer-press attachment 26 secures the twelve or twenty-four inch outer square rod 10 or 11 in place with a thumbscrew 25.

Figure 13:
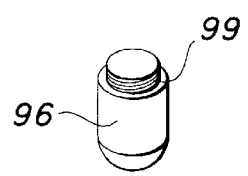
FIG. 13 is a perspective view of a three-quarter-inch screw-on spacer that attaches to the underside of the outer- and inner-press attachments. The screw-on nipple attaches to the underside of the specer to increase the depth of the impression for the various seed requirements.

On each of the outer-press attachment assembly's 100 and inner-press attachment assembly's 101 is a threaded opening 93 to attach spacers 97 and screw-on nipples 94, 95, and 96. The depth of the soil impression 55 is determined by the length of the quarter-inch screw-on nipples 94, shown in FIG. 10, half-inch screw-on nipples 95, shown in FIG. 11, and three-quarter inch screw-on nipples 96, shown in FIG. 12. A three-quarter inch screw-on extension 97, shown in FIG. 13, is to increase the length of the screw-on nipples 94, 95, and 96 in combination to further increase the soil impression depth 55. The spacer extension 97 has a three-sixteenths of an inch long by half an inch wide male thread 99 to attach to the underside of the outer- and inner-press attachments 100 and 101. The male thread 99 when fully inserted into the threaded opening 93 assists in further securing the outer-press attachment assembly 100 and inner-press attachment assembly 101 to the square rods 10 or 11. The female receptacle 98 on the opposite end of the extension 97 encircles the three-sixteenths of an inch long by half an inch wide male thread 99 of the screw-on nipples 94, 95, and 96.

The screw-on nipples come in a variety of sizes, a quarter-inch screw-on nipple 94, a half-inch screw-on nipple 95 and a three-quarter inch screw-on nipple 96. Each screw-on nipple has the option to increase the overall depth, in combination, by utilizing a three-quarter inch spacer extension 97, referenced in FIG. 2 and FIG. 13.

Figure 3:
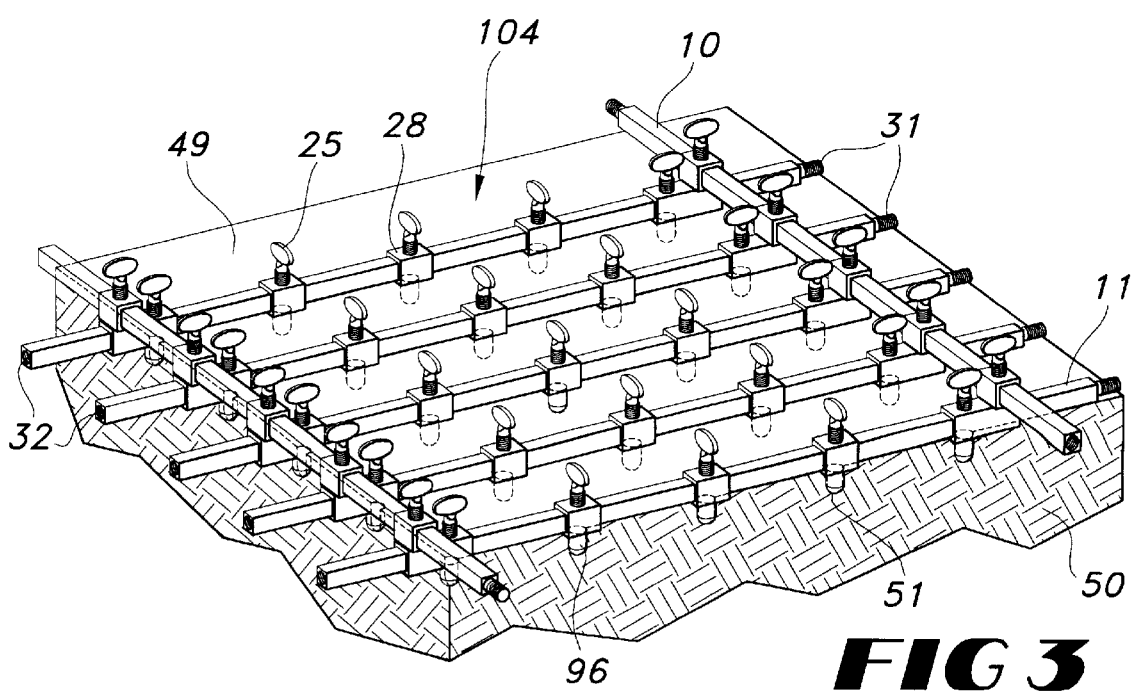
FIG. 3 is a perspective view of a manual press being pressed into a soil horizon to make an impression of predetermined depth and spacing for the preparation of seed sowing.
Figure 4:
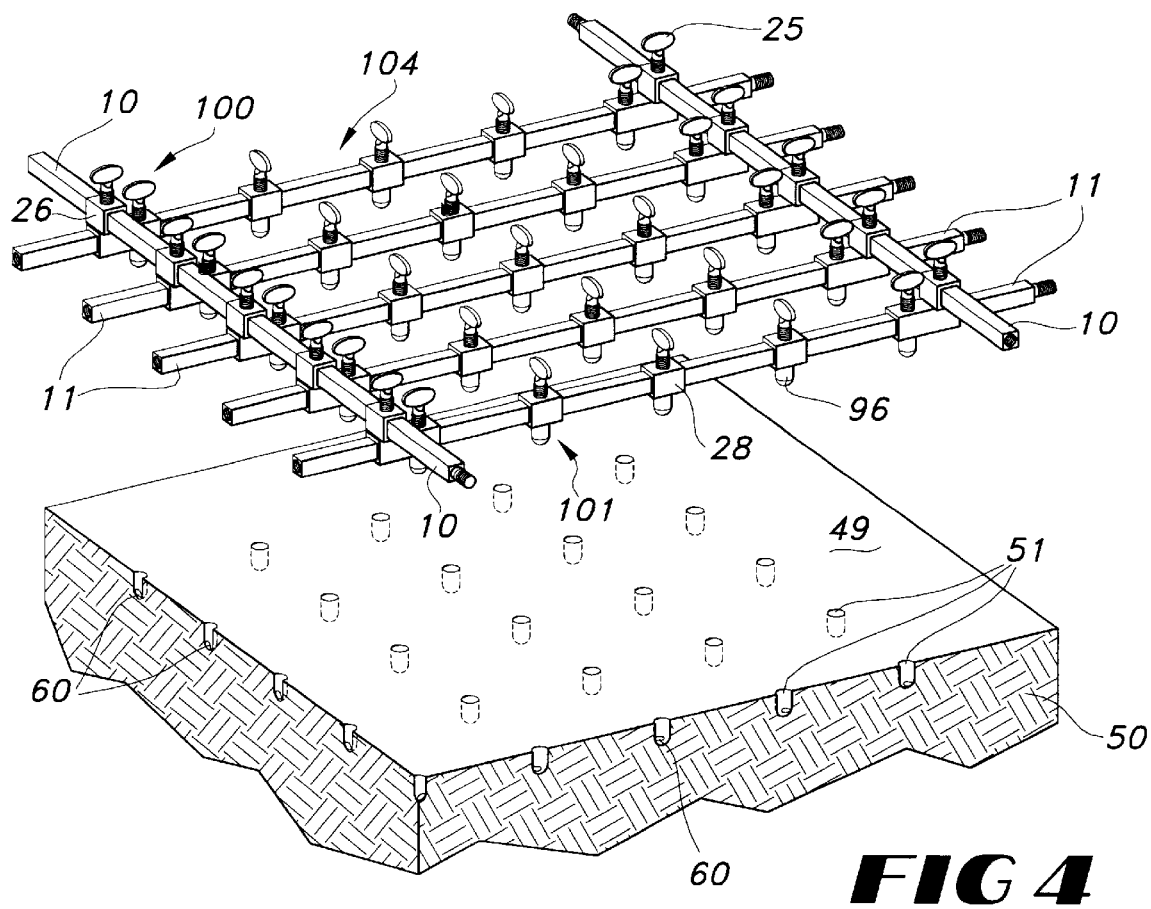
FIG. 4 is a perspective view of a manual press having completed making impressions in the soil horizon and within the impressions are manually sown seeds.
Figure 5:
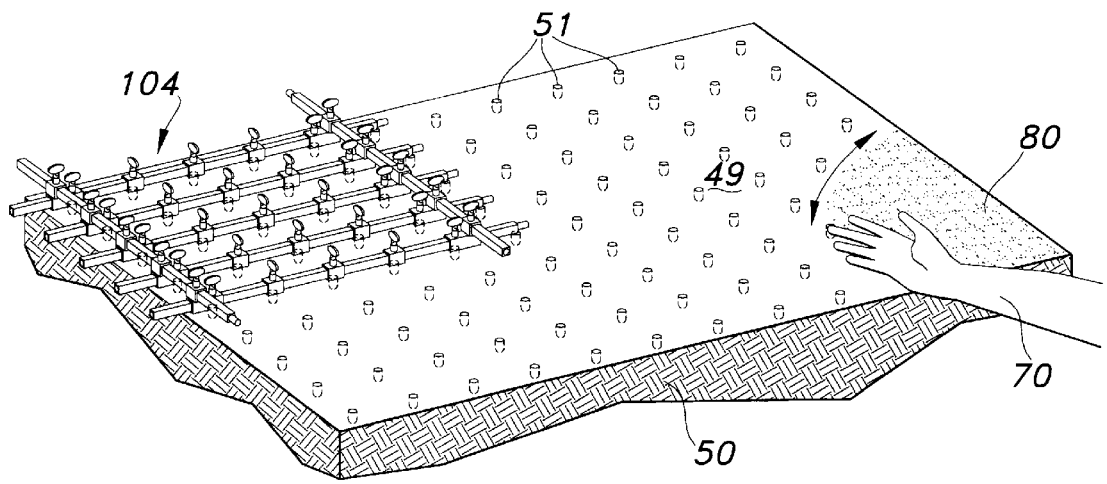
FIG. 5 is a perspective view of a manual press having made multiple impressions in a soil horizon in preparation for sowing a large area of seed. The press is shown in the front left-hand corner in an operative position to demonstrate that one press is used to prepare a determined area.

A soil horizon 49 is shown for illustrative purposes in FIGS. 3, 4 and 5 to demonstrate the effect of the manual-press 104 for the preparation of seed sowing. A cross-section through the soil profile 50 shows the impression made in the soil surface 51 before a seed is sown. After the impression 51 has been completed the seeds 60 are sown and covered with topsoil 80 by hand 70, best shown in FIG. 5.

Referencing FIG. 5, the manual press for the preparation of seed sowing 104 is shown against a larger area of coverage on the soil horizon 49 with multiple impressions being made in the soil surface 51. A cross-section through the soil profile 50 shows the clean impression 51 created by the press 104.

It is understood that while certain forms of the present invention have been illustrated and described herein, it is not to be limited to the specific forms or arrangements of parts described and shown.

I claim:

1. A preparatory device for sowing seeds comprising:
   a plurality of square rods each having a threaded male attachment on one end thereof, a threaded female attachment on the opposing end thereof and a plurality of length defining marks along an entire length of one side thereon,
   a plurality of outer press attachments, each outer attachment consisting of a 1-inch long upper square tube and a 2-inch lower square tube, the upper square tube being fixably connected in a perpendicular, horizontal relationship to the lower square tube,
   each of said outer attachments having two square ports extending in a perpendicular direction with respect to one another, the square ports each sized to slidably accommodate one of said square rods, each of said square rods being fixed to either said upper square tube or said lower square tube of said outer press attachment, the square rods being fixed by means of a threaded thumbscrew selectively having a spacer wherein the thumbscrew extends through top surfaces of both the upper and lower square tubes and therein applying securing pressure to a top surface of respective square rods, the lower square tubes having additional downwardly depending threaded nipples which act as further securing means; and,
   a plurality of inner press attachments consisting of a second 1-inch long square tube having a second square port for slidably accommodating the square rods, each inner press attachment having a threaded thumbscrew extending through a top surface and a downwardly depending threaded nipple through a bottom surface, the inner press attachments existing between a least two outer press attachments.

2. The device of claim 1 wherein the spacer is selectively disengagable from the thumbscrew and installable between a threaded portion of each of the nipples and the respective square rod to therein extend the planting depth of the device.

3. The device defined in claim 1 wherein a plurality of said square rods make up a lateral framework supported by a plurality of said outer-press attachment, enclosing a plurality of inner-press attachments, wherein a plurality of said square rods connected end to end with a plurality of said rods form a plurality of said frameworks.

* * * * *